3,200,083
ZEOLITIC MOLECULAR SIEVES CONTAINING A PLATINUM GROUP METAL IN THE INNER ADSORPTION REGION
Robert M. Milton, White Plains, N.Y., assignor to Union Carbide Corporation, a corporation of New York
No Drawing. Filed Sept. 24, 1958, Ser. No. 762,961
10 Claims. (Cl. 252—455)

This invention relates to zeolitic molecular sieves containing at least one metal selected from the group consisting of ruthenium, rhodium, palladium, osmium, iridium and platinum which are suitable for use as improved catalysts.

Ruthenium has been known to be a suitable Fischer Tropsch hydrocarbon synthesis catalyst. In addition, rhodium, palladium, osmium, iridium and platinum may also be employed for this purpose, platinum being preferred. Rhodium is commonly employed as an isomerization catalyst particularly when supported by gamma alumina or by a silica-alumina gel. Palladium is a very efficient hydrogenation catalyst. Osmium is valuable as a catalyst in the synthesis of ammonia.

Platinum is well known as a catalyst for gasoline reforming particularly when supported by gamma alumina or silica-alumina gel. It is commonly used unsupported in the oxidation of ammonia. When supported on silica gel the platinum is a useful catalyst for the oxidation of sulphur dioxide. When supported with gamma alumina or silica-alumina gel platinum is suitable for the catalysis of the isomerization of hydrocarbons. Platinum has been found to be a very efficient oxidation catalyst for fumes. Filament platinum has been employed for the decomposition of ammonia.

It would be desirable to provide these catalysts in a form having a very high metal surface as an integral part of a specific support material.

Accordingly, it is an object of this invention to provide a new composition of matter which is a superior catalyst.

Other objects will be apparent from the subsequent disclosure and appended claims.

A composition of matter which satisfies the objects of the present invention comprises a zeolitic molecular sieve containing a substantial quantity of at least one metal selected from the group consisting of ruthenium, rhodium, palladium, osmium, iridium and platinum in the internal adsorption area of the zeolitic molecular sieve. This composition of matter contains the metal in a form having a high specific surface which is suitable for chemisorption and catalysis.

Zeolitic molecular sieves, both natural and synthetic, are metal aluminosilicates. The crystalline structure of these materials is such that a relatively large adsorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by elemental metal is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperature and pressure. Included among these molecular sieves, and preferred for the purposes of the present invention, are the natural zeolite faujasite, and synthetic zeolites X, Y, and L. The natural materials are adequately described in the chemical art. The characteristics of the aforementioned synthetic materials, and the processes for making them, are provided below.

The general formula for zeolite X, expressed in terms of mol ratios of oxides, is as follows:

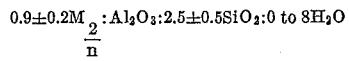

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented by the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is

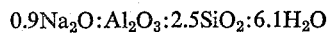

The major lines in the X-ray diffraction pattern of zeolite X are set forth in Table A below:

Table A

| d Value of Reflection in A. | $100I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $$\frac{100I}{I_0}$$

where $I_0$ is the intensity of the strongest line or peak, and $d(obs)$ the interplanar spacing in A., corrresponding to the recorded lines were calculated. The X-ray patterns indicate a cubic unit cell of dimensions between 24.5 A. and 25.5A.

To make sodium zeolite X, reactants are mixed in aqueous solution and held at about 100° C. until the crystals of zeolite are formed. Preferably the reactants should be such that in the solution the following ratios prevail:

$SiO_2/Al_2O_3$ _____ 3–5
$Na_2O/SiO_2$ _____ 1.2–1.5
$H_2O/Na_2O$ _____ 35–60

The chemical formula for zeolite Y expressed in terms of oxide mole ratios may be written as $$0.9 \pm 0.2 Na_2O : Al_2O_3 : WSiO_2 : XH_2O$$

wherein "W" is a value greater than 3 up to about 5 and "X" may be a value up to about 9.

Zeolite Y has a characteristic X-ray powder diffraction pattern which may be employed to identify zeolite Y. The x-ray powder diffraction data are shown in Table B. The values for the interplanar spacing, $d$, are expressed in angstrom units. The relative intensity of the lines of the X-ray powder diffraction data are expressed as VS, very strong; S, strong; M, medium; W, weak; and VW, very weak.

Table B

| hkl | $h^2+k^2+l^2$ | d in A. | Intensity |
| --- | --- | --- | --- |
| 111 | 3 | 14.3–14.4 | VS. |
| 220 | 8 | 8.73–8.80 | M. |
| 311 | 11 | 7.45–7.50 | M. |
| 331 | 19 | 5.67–5.71 | S. |
| 333, 511 | 27 | 4.75–5.08 | M. |
| 440 | 32 | 4.37–4.79 | M. |
| 620 | 40 | 3.90–4.46 | W. |
| 533 | 43 | 3.77–3.93 | S. |
| 444 | 48 | 3.57–3.79 | VW. |
| 551, 711 | 51 | 3.46–3.48 | VW. |
| 642 | 56 | 3.30–3.33 | S. |
| 553, 731 | 59 | 3.22–3.24 | W. |
| 733 | 67 | 3.02–3.04 | M. |
| 660, 822 | 72 | 2.91–2.93 | M. |
| 555, 751 | 75 | 2.85–2.87 | S. |
| 840 | 80 | 2.76–2.78 | M. |
| 753, 911 | 83 | 2.71–2.73 | W. |
| 664 | 88 | 2.63–2.65 | M. |
| 931 | 91 | 2.59–2.61 | M. |
| 844 | 96 | 2.52–2.54 | VW. |
| 862; 10, 2, 0 | 104 | 2.42–2.44 | VW. |
| 666; 10, 2, 2 | 108 | 2.38–2.39 | M. |
| 775; 11, 1, 1 | 123 | 2.22–2.24 | VW. |
| 880 | 128 | 2.18–2.20 | W. |
| 955; 971; 11, 3, 1 | 131 | 2.16–2.18 | VW. |
| 973; 11, 3, 3 | 139 | 2.10–2.11 | VW. |
| 884; 12, 0, 0 | 144 | 2.06–2.07 | VW. |
| 886; 10, 8, 0; 12, 4, 2 | 164 | 1.93–1.94 | VW. |
| 10, 8, 2 | 168 | 1.91–1.92 | VW. |
| 995; 13, 3, 3 | 187 | 1.81–1.82 | VW. |
| 11, 7, 5; 13, 5, 1 | 195 | 1.77–1.78 | VW. |
| 10, 8, 6; 10, 10, 0; 14, 2, 0 | 200 | 1.75–1.78 | W. |
| 997; 11, 9, 3 | 211 | 1.70–1.71 | W. |

When an aqueous colloidal silica sol is employed as the major source of silica, zeolite Y may be prepared by preparing an aqueous sodium aluminosilicate mixture having a composition, expressed in terms of oxide-mole-ratios, which falls within one of the following ranges:

| | | | |
| --- | --- | --- | --- |
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
| --- | --- | --- | --- |
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mol ratios of oxides, may be represented as follows:

$$1.0 \pm 0.1 M_{\frac{2}{n}}O : Al_2O_3 : 6.4 \pm 0.5 SiO_2 : yH_2O$$

wherein "M" designates a metal, "n" represents the valence of "M"; and "y" may be any value from 0 to about 7.

The more significant $d(A.)$ values, i.e., interplanar spacings, for the major lines in the X-ray diffraction pattern of zeolite L, are given below in Table C.

Table C 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal alumino-silicate mixture having a composition, expressed in terms of mole ratios of oxides falling within the following range:

$K_2O/(K_2O+Na_2O)$ _____ From about 0.33 to about 1.
$K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

One method available for preparing the elemental metal-containing zeolitic molecular sieves comprises treating the molecular sieves with an aqueous solution containing complex water-soluble metal-amine cations, both organic and inorganic, of the metal to be deposited in the crystal structure. These complex cations ion-exchange with the cations normally present in the zeolite. The exchanged zeolite is then removed from the solution, dried and activated, for example, by heating the molecular sieve up to a temperature of about 350° C. in a flowing stream of inert dry gas or vacuum. The activation should be effected at a temperature below the temperature at which the complex cations are destroyed. The activated molecular sieve may then be subjected to heat treatment to a temperature not exceeding about 650° C. and preferably not exceeding about 500° C. in vacuum or inert atmosphere whereby the complex cation is destroyed and the metal is reduced in the molecular sieve. Should the thermal treatment be insufficient to reduce the complex cations to the metallic state chemical reduction either alone or in combination with thermal reduction may be employed. Alkali metals such as sodium are suitable reducing agents for this purpose. Throughout the operation excessive temperatures and extremes of acidity are to be avoided since they may tend to destroy the crystal structure of the zeolitic molecular sieve.

To illustrate this process and the composition of matter of the present invention, tetramine platinous chloride hydrate, $Pt(NH_3)_4Cl \cdot H_2O$, was prepared according to the method found in the reference, Fernelius, W. C., Inorganic Syntheses, vol. II, 250 (1946). To 2.5 grams of tetramine platinous chloride hydrate in 500 milliliters of water was added 62 grams of hydrated sodium zeolite X powder with stirring. After stirring for one hour the resultant suspension was filtered and washed first with distilled water, then alcohol, and finally ether. It was dried in air. Some of the sodium cations had been replaced by a complex cation containing platinum. Upon heating the complex ion-exchanged zeolite at 375° C. in hydrogen for two hours, ammonia was evolved and the platinum was reduced to the metallic state within the molecular sieve. Hydrogen cations replaced the complex cations which had been present in the molecular sieve structure and the remainder of the cations were the original sodium cations.

Approximately 1.4 grams of palladium chloride were dissolved in 100 milliliters of concentrated ammonia. The solution was heated to boiling to remove excess ammonia and cooled. Ten grams of sodium zeolite X were suspended in the solution and the suspension was stirred for 20 minutes. The zeolite crystals were filtered and then washed with water then alcohol and ether. The crystals were heated to 375° C. in air yielding a palladium-loaded molecular sieve containing 5.7 weight-percent of palladium metal.

An aqueous solution of ruthenium-amine complex cations was prepared by dissolving a gram of ruthenium chloride in 25 milliliters of water and adding thereto 150 milliliters of aqueous ammonia. The solution was boiled for two hours after which it was red-violet. To this solution was added 7 grams of sodium zeolite X slurried in 50 milliliters of water. It was stirred for 5 minutes and then filtered. The product was dried overnight at 100° C. Heating the molecular sieve at an elevated temperature produced a ruthenium-metal-loaded zeolite containing 7.1 weight-percent ruthenium.

An aqueous suspension consisting of 20 grams of zeolite Y suspended in 200 milliliters of water was mixed with 100 milliliters of an aqueous solution containing one gram of tetramine platinous chloride hydrate, $[Pt(NH_3)_4]Cl_2 \cdot H_2O$. The mixture was stirred for 2 hours. The ion-exchanged zeolite produced was removed by filtering, washed with distilled water and dried, at 110° C. for one hour. The dried product was heated at 400° C. to drive off volatile constituents including the intracrystalline water; decomposition of the complex cations resulted to produce a platinum-loaded molecular sieve containing 2.9 weight-percent of platinum.

Still another process which is suitable for the preparation of the new compositions of matter of the present invention comprises intimately contacting an activated zeolitic molecular sieve (activated by any of the methods described previously) in an inert atmosphere with a fluid decomposable compound of the metal to be contained in the zeolitic molecular sieve whereby the decomposable compound is adsorbed by the zeolite molecular sieve in the inner adsorption region of the zeolite molecular sieve. The adsorbed decomposable compound is then reduced in situ to provide a metal having a high specific surface of corresponding high chemical and catalytic activity.

Adsorbable compounds which are suitable for introducing the metal into the molecular sieve are carbonyls and carbonyl hydrides. The reduction of the compound may be either chemical of thermal. In the case of chemical reduction the reducing agent may be deposited first in the inner adsorption area and the reducible compound introduced subsequently or alternatively the reducible compound may be sorbed into the inner adsorption area and the reducing agent introduced subsequently.

To illustrate this process a platinum-ethylenic complex compound was prepared by refluxing anhydrous sodium hexachloroplatinate (6 grams) with absolute ethanol (50 milliliters). The complete reaction of the sodium hexachloroplatinate was insured by the addition of saturated ammonium chloride solution which precipitated unreacted sodium hexachloroplatinate as an insoluble ammonium salt. The resulting solution was evaporated to dryness and the platinum-ethylenic complex was extracted with chloroform (150 milliliters). Zeolite X powder (5 grams) was added to the solution and shaken for one hour to permit the adsorption of the platinum-ethylenic complex from the solution by the zeolite. The solution was then filtered and the zeolite dried. The zeolite was treated with hydrogen at 150° C. to reduce the adsorbed platinum-ethylenic complex to free platinum metal. The resulting product was zeolite X containing 2.18 percent by weight metallic platinum as determined by elemental analysis.

As was stated previously in the utilization of these metals for catalytic purposes they have also been supported by alumina, silica, mixtures thereof and aluminosilicates; when contained in the inner adsorption area of molecular sieves the metals provide superior catalysts because the metal is contained in the finest possible distribution in a highly active form. Molecular sieves have a higher surface area than any of the other catalyst supports. The uniform structure of the molecular sieves provides uniform activity throughout the catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction . The selectivity of the various molecular sieves will in any case exclude the interfering materials from the catalytic surface while in no way preventing the desired materials from contacting this surface. Further the chemical and catalytic nature of the molecular sieve itself may be altered to suit the requirements of the reactants by the selection of the most suitable cation present in the molecular sieve structure.

As used herein the term "activation" is employed to designate the removal of water from the zeolitic molecular sieves, i.e., dehydration, and does not refer to catalytic activity. The zeolite molecular sieves containing the elemental metal exhibit catalytic activity.

The product of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

To illustrate the utility of the materials of the present invention platinum-loaded sodium zeolite X containing 0.18 weight-percent of platinum (prepared by the decomposition of a platinum-ethylene complex) was added to 5 cubic centimeters of cyclohexene and the mass was subjected to 55 p.s.i.g hydrogen pressure at room temperature. The results are shown in Table E.

*Table E*

| Test | Amount of Catalyst Used, gms. | Total Platinum Contained in Catalyst, milligrams | Time Necessary for Complete Hydrogenation, Minutes |
|---|---|---|---|
| | 3.0 | 11.4 | 8 |
| | 1.7 | 37.0 | 2.5 |

Sample 1 was prepared by adsorbing the platinum-ethylene compound from an acetone solution and thermally decomposing the dried product. Sample 2 was prepared by adsorbing the platinum-ethylene compound from chloroform solution and chemically decomposing it with hydrogen.

Following similar procedures a 15 percent conversion of tetralin to naphthalene was attained by refluxing tetralin with platinum-loaded sodium zeolite X containing 0.5 weight-percent of platinum for four hours at 207° C.

Eighteen grams of platinum-loaded sodium zeolite X containing 0.45 weight-percent of platinum were charged into a reactor tube. Hydrogen at the rate of 1.9 cubic feet per hour and cyclohexane at the rate of 10 milliliters of liquid per hour were passed through the catalyst bed at atmospheric pressure and at a temperature of 375° C. The product contained 78 volume percent benzene and 22 volume percent cyclohexane.

Following similar procedures methyl cyclohexane was converted completely to toluene at atmospheric pressure and at a temperature of 380° C.

Zeolite X is described and claimed in U.S. Patent No. 2,882,244 issued April 14, 1959 to R. M. Milton.

Zeolite Y is described and claimed in U. S. Patent No. 3,130,007 issued April 21, 1964.

Zeolite L is described and claimed in U.S. Patent application Serial No. 711,565 filed January 28, 1958 and now abandoned.

The preferred compositions of matter for the present invention which have been found to be most satisfactory and useful for catalytic purposes are the metal-loaded zeolites X, Y, and faujasite.

What is claimed is:

1. As a new composition of matter, a dehydrated rigid three-dimensional crystalline metal alumino-silicate zeolite of the molecular sieve type containing at least one elemental metal selected from the group consisting of ruthenium, rhodium, palladium, osmium, iridium and platinum in the inner adsorption region of said crystalline metal aluminosilicate zeolite, said crystalline metal aluminosilicate zeolite being characterized as being capable of adsorbing benzene internally.

2. As a new composition of matter, a dehydrated rigid three-dimensional crystalline metal aluminosilicate zeolite of the molecular sieve type selected from the group consisting of zeolite X, zeolite Y, zeolite L and faujasite containing at least one elemental metal selected from the group consisting of ruthenium, rhodium, palladium, osmium, iridium and platinum in the inner adsorption region of said crystalline metal aluminosilicate zeolite.

3. A composition of matter as described in claim 2 wherein the crystalline metal aluminosilicate zeolite is zeolite X.

4. A composition of matter as described in claim 2 wherein the crystalline metal aluminosilicate zeolite is zeolite Y.

5. A catalyst composition consisting essentially of a dehydrated rigid three-dimensional crystalline metal aluminosilicate zeolite of the molecular sieve type, capable of adsorbing benzene internally, containing an elemental metal selected from the group consisting of platinum, palladium, ruthenium, osmium, iridium and rhodium in the inner adsorption region of said zeolite.

6. A catalyst composition consisting essentially of dehydrated zeolite X containing an elemental metal selected from the group consisting of platinum, palladium, ruthenium, osmium, iridium and rhodium in the inner adsorption region of said zeolite.

7. A catalyst composition consisting essentially of dehydrated zeolite Y containing an elemental metal selected from the group consisting of platinum, palladium, ruthenium, osmium, iridium and rhodium in the inner adsorption region of said zeolite.

8. A catalyst composition consisting essentially of dehydrated zeolite L containing an elemental metal selected from the group consisting of platinum, palladium, ruthenium, osmium, iridium and rhodium in the inner adsorption region of said zeolite.

9. A catalyst composition consisting essentially of dehydrated zeolite Y containing elemental platinum in the inner adsorption region of said zeolite.

10. A catalyst composition consisting essentially of dehydrated zeolite Y containing elemental palladium in the inner adsorption region of said zeolite.

References Cited by the Examiner

UNITED STATES PATENTS

| 1,840,450 | 1/32 | Jaeger et al. | 252—454 |
| 2,306,610 | 12/42 | Barrer | 252—449 |
| 2,413,134 | 12/46 | Barrer | 252—449 |
| 2,617,712 | 11/52 | Bond | 252—455 |
| 2,882,243 | 4/59 | Milton | 252—455 |
| 2,882,244 | 4/59 | Milton | 252—455 |

MAURICE A. BRINDISI, *Primary Examiner.*

JULIUS GREENWALD, *Examiner.*